US011546663B2

(12) United States Patent
Zhao (10) Patent No.: US 11,546,663 B2
(45) Date of Patent: Jan. 3, 2023

(54) VIDEO RECOMMENDATION METHOD AND APPARATUS

(71) Applicant: BEIJING DAJIA INTERNET INFORMATION TECHNOLOGY CO., LTD., Beijing (CN)

(72) Inventor: Zhipu Zhao, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/842,270

(22) Filed: Jun. 16, 2022

(65) Prior Publication Data

US 2022/0312077 A1 Sep. 29, 2022

Related U.S. Application Data

(63) Continuation of application No. PCT/CN2021/073044, filed on Jan. 21, 2021.

(30) Foreign Application Priority Data

Jan. 21, 2020 (CN) .......................... 202010072107.2

(51) Int. Cl.
*H04N 21/466* (2011.01)
*H04N 21/25* (2011.01)
*H04N 21/81* (2011.01)
*G06F 16/783* (2019.01)
*G06F 16/735* (2019.01)

(52) U.S. Cl.
CPC ....... *H04N 21/4668* (2013.01); *G06F 16/735* (2019.01); *G06F 16/783* (2019.01); *H04N 21/252* (2013.01); *H04N 21/8153* (2013.01)

(58) Field of Classification Search
CPC ............. H04N 21/4668; H04N 21/252; H04N 21/8153
USPC .......................................................... 725/87
See application file for complete search history.

(56) References Cited

U.S. PATENT DOCUMENTS

2017/0064397 A1* 3/2017 Iyer .................... H04N 21/4755
2017/0078707 A1 3/2017 Barber
2017/0164027 A1* 6/2017 Zhang .................... H04N 21/84
(Continued)

FOREIGN PATENT DOCUMENTS

CN 105120336 A 12/2015
CN 106547767 A 3/2017
CN 107958030 A * 4/2018 ........... G06F 16/743
(Continued)

OTHER PUBLICATIONS

International Search Report for International Application No. PCT/CN2021/073044 dated Apr. 8, 2021 (29 pages).
(Continued)

*Primary Examiner* — Cynthia M Fogg
(74) *Attorney, Agent, or Firm* — Reising Ethington, P.C.

(57) ABSTRACT

Provided are a video recommendation method and apparatus. The video recommendation method comprises obtaining a related video of a target video and a video cover associated with the related video, obtaining a video cover set, and sending to a server. The server can add different video covers to the target video on the basis of the video cover set, and recommend the target video to different user groups.

10 Claims, 7 Drawing Sheets

(56) References Cited

U.S. PATENT DOCUMENTS

2021/0201046 A1\* 7/2021 Xia .................. G06V 20/47

FOREIGN PATENT DOCUMENTS

| CN | 108650524 | A | \* | 10/2018 | ........... G06K 9/6256 |
|----|-----------|---|---|---------|-------------------------|
| CN | 108804452 | A | | 11/2018 | |
| CN | 109996091 | A | | 7/2019 | |
| CN | 110046263 | A | \* | 7/2019 | |
| CN | 110046263 | A | | 7/2019 | |
| CN | 110572711 | A | \* | 12/2019 | |
| CN | 110572711 | A | | 12/2019 | |
| CN | 110602564 | A | | 12/2019 | |
| CN | 111246255 | A | | 6/2020 | |
| CN | 109660854 | B | \* | 8/2021 | ........... H04N 21/258 |
| WO | WO2014054025 | A1 | | 4/2014 | |

OTHER PUBLICATIONS

Japanese Office Action for Japanese Application No. 202010072107.2 dated Aug. 3, 2021 (16 pages).

\* cited by examiner

VIDEO RECOMMENDATION METHOD AND APPARATUS

CROSS-REFERENCE TO RELATED APPLICATIONS

The present application is a Continuation Application of International Application No. PCT/CN2021/073044, filed on Jan. 21, 2021, which claims the priority to the Chinese Patent Application NO. 202010072107.2 filed on Jan. 21, 2020, the entire contents of which are hereby incorporated by reference.

TECHNICAL FIELD

The present disclosure relates to the field of Internet technologies, and particularly, to a method and apparatus for recommending a video, a storage medium, a terminal, and a server.

BACKGROUND

With the rapid development of Internet technologies, more and more users are beginning to use videos to record their lives and share the videos with other users.

Video covers, as signs of displaying video content, allow the users to have a general understanding of the video content, and their importance is self-evident.

SUMMARY

The present disclosure provides a method and apparatus for recommending a video, a storage medium, a terminal, and a server. The technical solutions of the present disclosure are as follows.

According to a first aspect of embodiments of the present disclosure, there is provided a method for recommending a video, which is used for a terminal, and the method includes: acquiring at least two related videos of a target video for each related video, searching for a video cover associated with the related video, wherein the video cover is determined according to behavior information of performing an operation on the related video by a user, and adding the video cover to a video cover set, wherein the video cover set includes a plurality of video covers; and sending the target video and the video cover set to a server, wherein the target video is added with different video covers by the server based on the video cover set and different user groups.

According to a second aspect of the embodiments of the present disclosure, there is provided a method for recommending a video, which is used for a server, and the method includes: receiving a target video and a video cover set sent by a terminal, wherein the video cover set includes a plurality of video covers; for any video cover in the video cover set, acquiring a video feature of the target video and a cover feature of the video cover, wherein the video feature includes a video type, and the cover feature includes a cover style; determining a user group corresponding to the video cover according to the video feature and the cover feature; and adding the video cover to the target video, and recommending the target video added with the video cover to the user group.

According to a third aspect of the embodiments of the present disclosure, there is provided an apparatus for recommending a video, which is used for a terminal, and the apparatus includes: a related video acquiring module, configured to acquire at least two related videos of a target video; a video cover set generating module, configured to, for each related video, search for a video cover associated with the related video, wherein the video cover is determined according to behavior information of performing an operation on the related video by a user, and add the video cover to a video cover set, wherein the video cover set includes a plurality of video covers; and a sending module, configured to send the target video and the video cover set to a server, wherein the target video is added with different video covers by the server based on the video cover set and different user groups.

According to a fourth aspect of the embodiments of the present disclosure, there is provided an apparatus for recommending a video, which is used for a server, and the apparatus includes: a receiving module, configured to receive a target video and a video cover set sent by a terminal, wherein the video cover set includes a plurality of video covers; a feature acquiring module, configured to, for any video cover in the video cover set, acquire a video feature of the target video and a cover feature of the video cover, wherein the video feature includes a video type, and the cover feature includes a cover style; a user group determining module, configured to determine a user group corresponding to the video cover according to the video feature and the cover feature; and a processing module, configured to add the video cover to the target video, and recommend the target video added with the video cover to the user group.

According to a fifth aspect of the embodiments of the present disclosure, there is provided a storage medium having a computer program stored thereon, wherein the program, when executed by a processor, implements steps of the method for recommending the video in any possible implementation of the present disclosure.

According to a sixth aspect of the embodiments of the present disclosure, there is provided a terminal, including a processor, a memory and a computer program stored on the memory and capable of being run on the processor, wherein the processor, when executing the program, implement steps of the method for recommending the video in the first aspect or any possible implementation of the first aspect.

According to a seventh aspect of the embodiments of the present disclosure, there is provided a terminal, including a processor, a memory and a computer program stored on the memory and capable of being run on the processor, wherein the processor, when executing the program, implement steps of the method for recommending the video in the second aspect or any possible implementation of the second aspect.

According to an eighth aspect of the embodiments of the present disclosure, there is provided a computer program product, including a computer program, which, when executed by a processor, implements steps of the method for recommending the video in any possible implementation of the present disclosure.

It should be understood that both the foregoing general description and the following detailed description are exemplary and explanatory only and not for limiting the present disclosure.

BRIEF DESCRIPTION OF THE DRAWINGS

Accompanying drawings herein, which are incorporated in and constitute a part of the disclosure, illustrate embodiments consistent with the present disclosure, and serve to explain the principles of the present disclosure together with the description, and do not constitute improper limitations on the present disclosure.

DETAILED DESCRIPTION

In order to make those skilled in the art better understand the technical solutions of the present disclosure, the technical solutions in embodiments of the present disclosure will be clearly and completely described below with reference to the accompanying drawings.

It should be noted that, the terms "first" and "second" in the specification, claims, and accompanying drawings of the present disclosure are used for distinguishing similar objects, and are not necessarily used to describe a specific sequence or order. It should be understood that data used in this way can be interchanged under appropriate circumstances, so that the embodiments of the present disclosure described herein may be implemented in a sequence other than those illustrated or described herein. Implementations described in the following exemplary embodiments do not represent all implementations consistent with the present disclosure. Instead, they are merely examples of apparatuses and methods consistent with aspects related to the present disclosure as recited in the appended claims.

Figure 1:
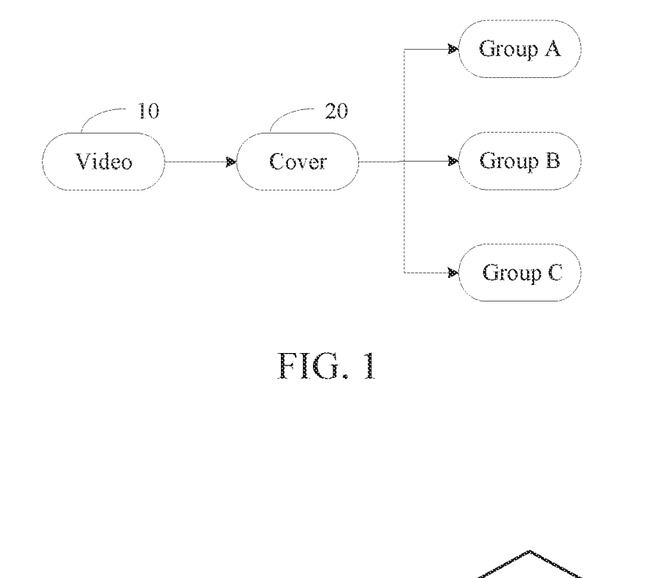
FIG. 1 is a principle diagram of video recommendation in the related art.

At present, a video recommended to a user has only a single cover, which is the same for all users. As shown in FIG. 1, a video 10 is provided with a single cover 20, and the video 10 added with the cover 20 is recommended to a user group A, a user group B, and a user group C. The cover of the video 10 is the same for the user group A, the user group B, and the user group C. However, different users have significant differences, and not all users are interested in the video cover. If the user is not interested in the video cover, the user may not to click to watch the video, which may result in a lower click rate of the video. Accordingly, it is necessary to provide personalized video covers based on different user groups, so as to increase the click rate of the video.

Figure 2:
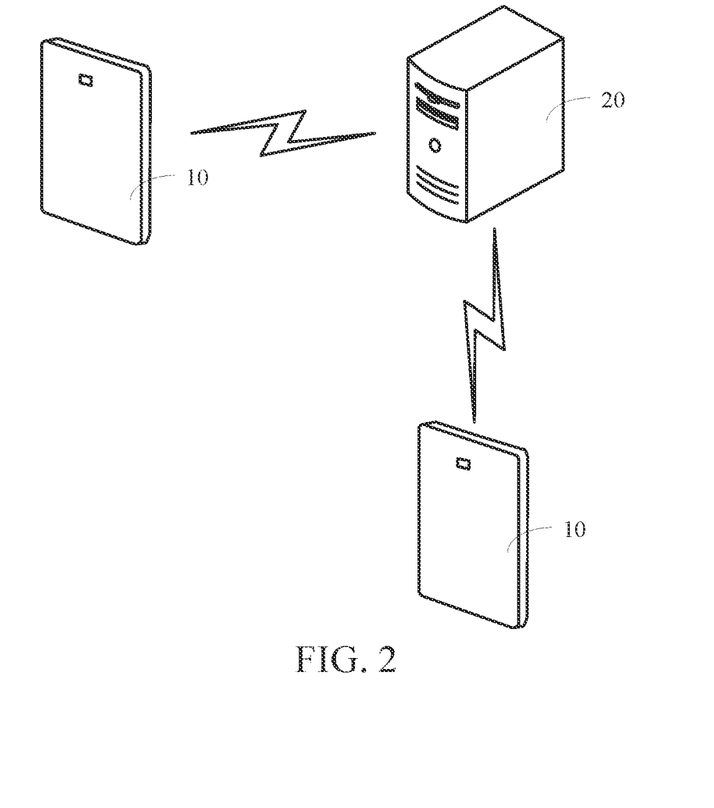
FIG. 2 is a network architecture diagram of a system for recommending a video according to an embodiment of the present disclosure.

FIG. 2 is a network architecture diagram of a system for recommending a video according to an embodiment of the present disclosure. As shown in FIG. 2, the network architecture includes a plurality of terminals 10 and one server 20.

Each terminal 10 may be a smartphone, a tablet computer, etc., and the terminal 10 is an electronic device running at least one video application (APP) client.

The server 20 is a background server of a video APP and is used to receive data sent by the terminal 10 or send the data to the terminal 10.

Figure 3:
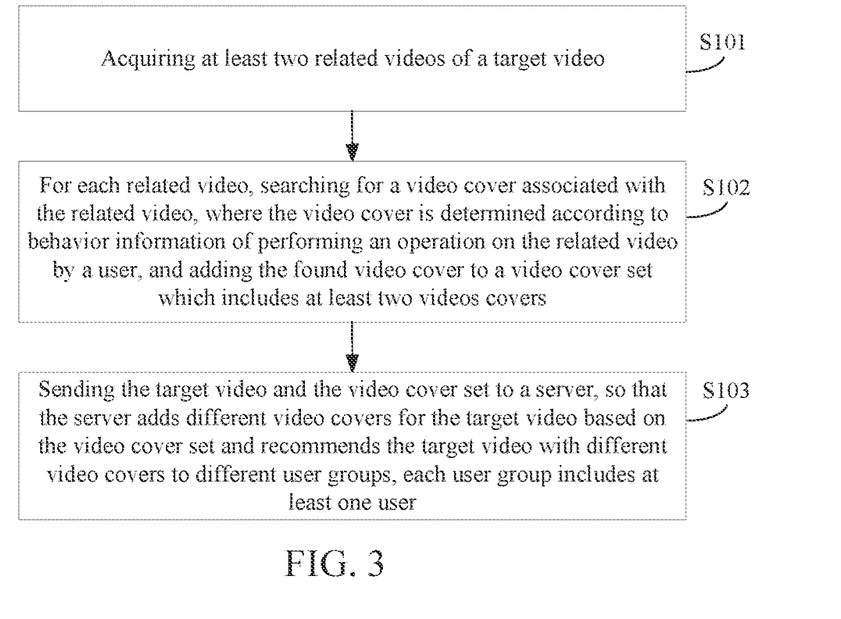
FIG. 3 is a schematic flowchart of a method for recommending a video at a client side according to an embodiment of the present disclosure.

FIG. 3 is a flowchart of a method for recommending a video according to an embodiment of the present disclosure. As shown in FIG. 3, the method for recommending the video is used in a terminal, and includes the following steps S101 to S103.

In the S101, at least two related videos of a target video are acquired.

In the embodiments of the present disclosure, the target video may be a video just shot by a user, or may be an existing video without a determined cover.

In the embodiments of the present disclosure, the related video of the target video may be, for example, a video having similar video content to the target video, or a video identical to the target video in terms of at least one of the following: a video author, a video posting location, or a video theme. The related video may be obtained from a video database through a video similarity matching algorithm, such as a content-based recommendation algorithm, a collaborative filtering recommendation algorithm, hybrid recommendation, or the like.

The content-based recommendation algorithm recommends content similar to content that the user liked in the past to the user according to the content that the user preferred in the past, calculates a similarity between items by using content attributes of the items, and determines the related video of the target video according to the similarity between the items.

The collaborative filtering may be mainly classified into user-based collaborative filtering, item-based collaborative filtering (ItemCF for short), and model-based collaborative filtering (such as matrix decomposition). The ItemCF algorithm mainly calculates the similarity between the items by analyzing user behavior data (such as the number of videos clicked, watched, forwarded, and commented by the user), and determines the related video of the target video according to the similarity between the items.

The hybrid recommendation determines the related video of the target video by combining multiple recommendation algorithms.

In the S102, for each related video, a video cover associated with the related video is searched, the video cover is determined according to behavior information of a user performing an operation on the related video, and the found video cover is added to a video cover set, the video cover set includes at least two video covers.

In the embodiments of the present disclosure, the video cover associated with the related video may be a video cover with the highest popularity, and the popularity of the video cover may be determined according to the behavior information of the user performing the operation on the related video added with the video cover.

In the S103, the target video and the video cover set are sent to a server, so that the server adds different video covers for the target video based on the video cover set and recommends the target video with different video covers to different user groups, and each user group includes at least one user.

In some embodiments of the present disclosure, before the searching for the video cover associated with the related video, the method further includes: acquiring the behavior information of the user performing the operation on the related video; determining popularity of individual video covers corresponding to the related video, respectively, based on the behavior information; and searching for a video cover with the highest popularity from all the video covers corresponding to the related video, and associating the related video with the video cover with the highest popularity.

In some embodiments of the present disclosure, the determining the popularity of the individual video covers corresponding to the related video, respectively, based on the behavior information includes: for each video cover corresponding to the related video, determining the popularity of the video cover according to the behavior information of the user performing the operation on the related video added with the video cover.

In the embodiments of the present disclosure, the popularity of the video cover may be determined according to the behavior information such as whether the user clicks and likes the related video added with the video cover, whether the user follows an author of the related video added with the video cover, and the like.

Figure 4:
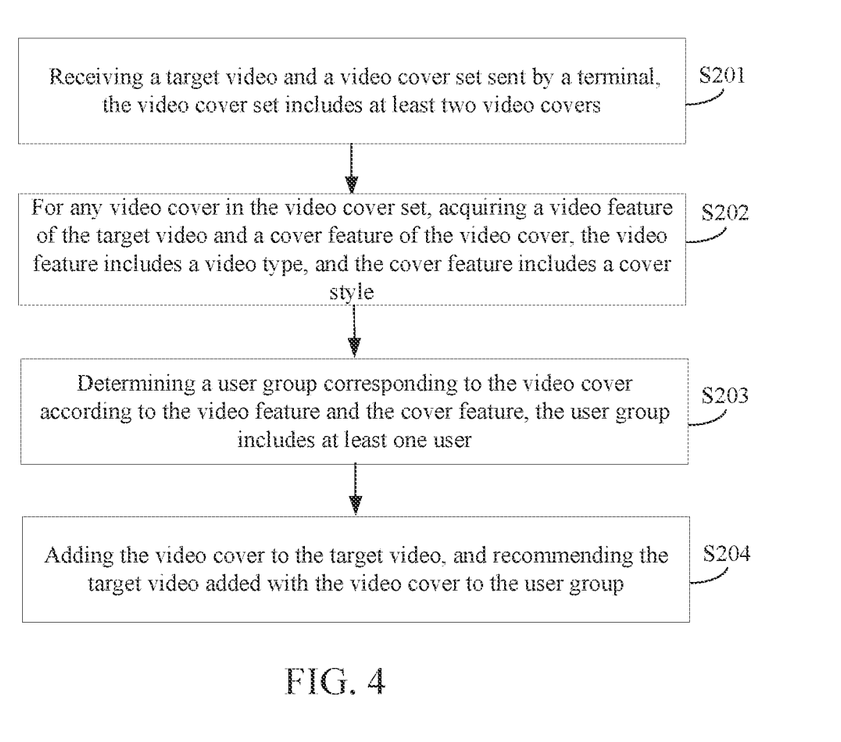
FIG. 4 is a schematic flowchart of a method for recommending a video at a server side according to an embodiment of the present disclosure.

FIG. 4 is a flowchart of a method for recommending a video according to another embodiment of the present disclosure. As shown in FIG. 4, the method for recommending the video is used in a server, and includes the following steps S201 to S204.

In the S201, a target video and a video cover set sent by a terminal are received, and the video cover set includes at least two video covers.

In the S202, for any video cover in the video cover set, a video feature of the target video and a cover feature of the video cover are acquired.

In the embodiments of the present disclosure, the video feature includes a type of a video, such as a food type, a sports type, a game type, and the like, and the cover feature includes a cover style.

In the S203, a user group corresponding to the video cover is determined according to the video feature and the cover feature, and the user group includes at least one user.

In some embodiments of the present disclosure, the determining the user group corresponding to the video cover according to the video feature and the cover feature in the S203 includes: obtaining an identification of a corresponding user group output by a pre-trained video recommendation model by inputting the video feature and the cover feature into the video recommendation model; and determining the user group corresponding to the identification as the user group corresponding to the video cover.

In the embodiments of the present disclosure, each user group is provided with a corresponding identification. For example, the user group A corresponds to an identification 0x1, the user group B corresponds to an identification 0x2, and the user group C corresponds to an identification 0x3.

In some embodiments of the present disclosure, the video recommendation model is trained in advance, which may be trained on the electronic device, the server, or the terminal. A training method of the video recommendation model includes: (1) acquiring a training sample set, each training sample in the training sample set including: a video feature of a video, a cover feature of a video cover, and an identification of a user group; where the training sample set may be obtained by the following operations: acquiring historical information for video recommendation, the historical information for video recommendation includes a large amount of video recommendation data, and each piece of video recommendation data records that a user recommends a certain video added with a certain video cover to a certain user group; for each piece of video recommendation data, according to the video recommendation data, acquiring the video feature of the video and the cover feature of the video cover, and determining the identification of the user group to which the video added with the video cover is recommended, that is, obtaining one training sample; and (2) training a model to be trained through the training sample set to obtain the video recommendation model.

In some other embodiments of the present disclosure, the determining the user group corresponding to the video cover according to the video feature and the cover feature in the S203 includes: determining a set of user groups corresponding to the video according to the video feature, and the set of user groups includes at least two user groups; and determining the user group corresponding to the video cover from the set of user groups according to the cover feature.

Figure 5:
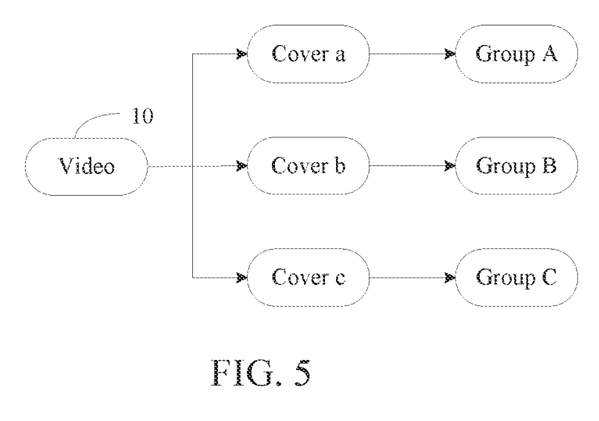
FIG. 5 is a principle diagram of video recommendation according to an embodiment of the present disclosure.

For example, for a certain video 10, it is determined that the video cover set of this video includes a video cover a, a video cover b, and a video cover c and the video feature of the video includes a game. A user group corresponding to the game is searched, and it is determined that the video may be recommended to a set of user groups including the user group A, the user group B and the user group C. And then it is respectively determined that the video cover a corresponds to the user group A, the video cover b corresponds to the user group B, and the video cover c corresponding to the user group C according to cover features of respective video covers (such as the cover styles). In other words, the video 10 added with the video cover a may be recommended to the user group A, the video 10 added with the video cover b may be recommended to the user group B, and the video 10 added with the video cover c may be recommended to the user group C, as shown in FIG. 5.

In the S204, the video cover is added to the target video, and the target video added with the video cover is recommended to the user group.

In some embodiments of the present disclosure, in response to the receiving the target video and the video cover set sent by the terminal, the method further includes: verifying the target video and the video cover in the video cover set according to a set screening strategy; and in response to the target video passing verification, for any video cover in the video cover set passing the verification, performing a step of acquiring the video feature of the target video and acquiring the cover feature of the video cover.

The screening strategy may include, for example, filtering a video cover with a negative tag (such as sensitive content, reported, etc.), filtering a video that violates laws and regulations (such as a violent video, a pornographic video).

In the technical solutions provided by the embodiments of the present disclosure, the target video and the video cover set sent by the terminal are first received, and then for any video cover in the video cover set, the video feature of the target video and the cover feature of the video cover are acquired, the user group corresponding to the video cover is determined according to the video feature and the cover feature. Thereafter, the video cover is added to the target video and the target video added with the video cover is recommended to the user group. In this way, it is achieved that different video covers may be added to the video in a case of different users, thereby providing the user with the video cover in which is he/she is interested, and solving a problem of single video cover.

Figure 6:
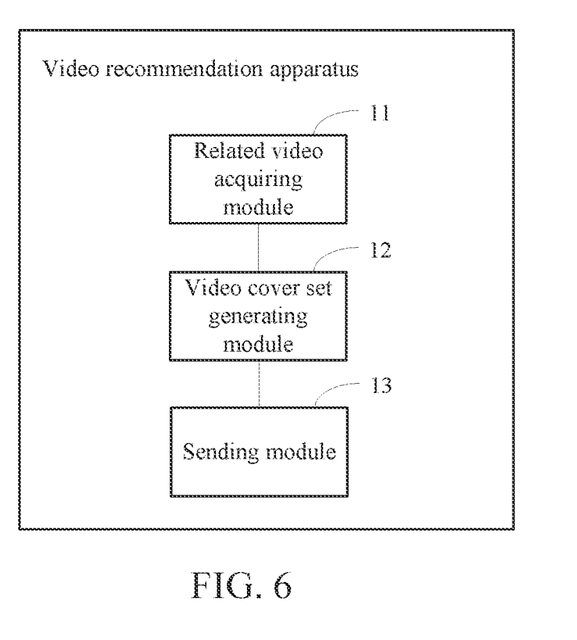
FIG. 6 is a first schematic structural diagram of an apparatus for recommending a video at a client side according to an embodiment of the present disclosure.

The embodiments of the present disclosure further provide an apparatus for recommending a video, and FIG. 6 is a block diagram of an apparatus for recommending a video according to an embodiment of the present disclosure. Referring to FIG. 6, the apparatus for recommending the video is used in a terminal and includes: a related video acquiring module 11, a video cover set generating module 12 and a sending module 13.

The related video acquiring module 11 is configured to acquire at least two related videos of a target video; the video cover set generating module 12 is configured to, for each related video, search for a video cover associated with the related video, where the video cover is determined according to behavior information of performing an operation on the related video by a user, and add the found video cover to a video cover set, the video cover set includes at least two video covers; and the sending module 13 is configured to send the target video and the video cover set to a server, so that the server adds different video covers for the target video based on the video cover set and recommends the target video with different video covers to different user groups, and each user group includes at least one user.

In some embodiments of the present disclosure, the video cover associated with the related video is a video cover with the highest popularity.

Figure 7:
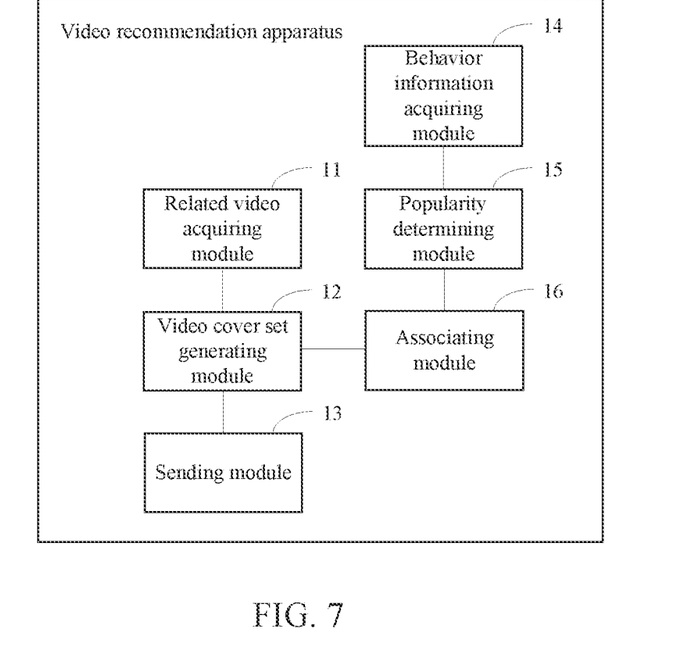
FIG. 7 is a second schematic structural diagram of an apparatus for recommending a video at a client side according to an embodiment of the present disclosure.

As shown in FIG. 7, the apparatus for recommending the video further includes: a behavior information acquiring module 14, configured to acquire the behavior information of performing the operation on the related video by the user; a popularity determining module 15, configured to, determine popularity of each video cover corresponding to the related video based on the behavior information; and an associating module 16, configured to determine a video cover with the highest popularity from all video covers corresponding to the related video, and associate the related video with the video cover with the highest popularity.

In some embodiments of the present disclosure, the popularity determining module 15 is configured to: for each video cover corresponding to the related video, determine the popularity of the video cover according to the behavior information of performing the operation on the related video added with the video cover by the user.

Figure 8:
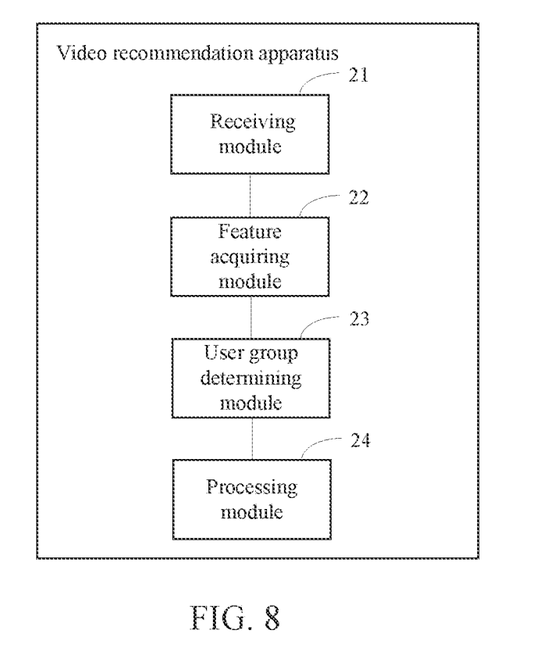
FIG. 8 is a first schematic structural diagram of an apparatus for recommending a video at a server side according to an embodiment of the present disclosure.

The embodiments of the present disclosure further provide an apparatus for recommending a video, and FIG. 8 is a block diagram of an apparatus for recommending a video according to an embodiment of the present disclosure. Referring to FIG. 8, the apparatus for recommending the video is used in a server and includes: a receiving module 21, a feature acquiring module 22, a user group determining module 23 and a processing module 24.

The receiving module 21 is configured to receive a target video and a video cover set sent by a terminal, wherein the video cover set includes a plurality of video covers; the feature acquiring module 22 is configured to, for any video cover in the video cover set, acquire a video feature of the target video and a cover feature of the video cover, wherein the video feature includes a video type, and the cover feature includes a cover style; the user group determining module 23 is configured to determine a user group corresponding to the video cover according to the video feature and the cover feature; and the processing module 24 is configured to add the video cover to the target video, and recommend the target video added with the video cover to the user group.

In some embodiments of the present disclosure, the user group determining module 23 is configured to: input the video feature and the cover feature into a pre-trained video recommendation model, and obtain an identification corresponding to a user group output by the video recommendation model; and determine the user group corresponding to the identification as the user group corresponding to the video cover.

In some embodiments of the present disclosure, the user group determining module 23 is configured to: determine a set of user groups corresponding to the target video according to the video feature, and the set of user groups includes at least two user groups; and determine the user group corresponding to the video cover from the set of user groups according to the cover feature.

Figure 9:
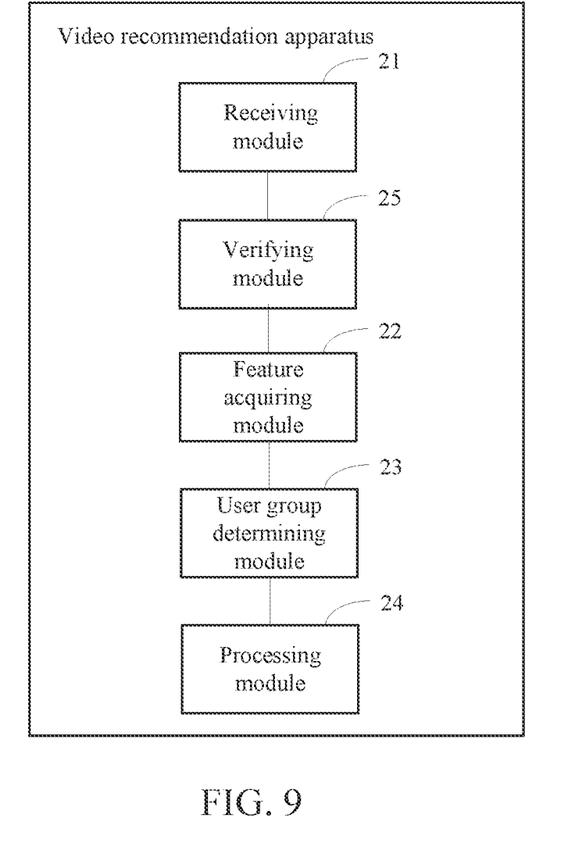
FIG. 9 is a second schematic structural diagram of an apparatus for recommending a video at a server side according to an embodiment of the present disclosure.

In some embodiments of the present disclosure, as shown in FIG. 9, the apparatus for recommending the video further includes: a verifying module 25, configured to verify the target video and the video cover in the video cover set according to a set screening strategy; and the feature acquiring module 22 is configured to: in response to the target video passing verification of the verifying module 25, for any video cover in the video cover set passing the verification of the verifying module 25, perform the step of acquiring the video feature of the target video and acquiring the cover feature of the video cover.

For implementation processes of functions and roles of individual units in the above apparatuses, reference may be made to the implementation processes of the corresponding steps in the above methods for details, which are not be repeated herein.

For the apparatus embodiments, as they may substantively correspond to the method embodiments, the related parts may refer to the descriptions for the method embodiments. The apparatus embodiments described above are merely illustrative, where the units described as separate components may or may not be physically separated, and the components displayed as units may or may not be physical units, i.e., may be located at the same place or may be distributed in multiple network units. According to actual needs, part of or all of the modules may be selected to achieve purposes of the solution of the present disclosure, which can be understood and implemented by those of ordinary skill in the art without creative work.

The embodiments of the present disclosure further provide a storage medium, having a computer program stored thereon. The program, when executed by a processor, implements steps of the method for recommending the video in any possible implementation of the present disclosure.

In some embodiments of the present disclosure, the storage medium may be a non-transitory computer readable storage medium, which may be, for example, a ROM, a Random Access Memory (RAM), a CD-ROM, a magnetic tape, a floppy disc, an optical data storage device, and the like.

The embodiments of the present disclosure further provide a computer program product, including a computer program, which, when executed by a processor, implements steps of the method for recommending the video in any possible implementation of the present disclosure.

The embodiments of the present disclosure further provide a terminal, including: a memory, a processor and a computer program stored on the memory and capable of being run on the processor; and the processor is configured to: acquire at least two related videos of a target video; for each related video, search for a video cover associated with the related video, where the video cover is determined according to behavior information of performing an operation on the related video by a user, and add the found video cover to a video cover set, the video cover set includes at least two video covers; and send the target video and the video cover set to a server, so that the server adds different video covers for the target video based on the video cover set and recommends the target video with different video covers to different user groups, and each user group includes at least one user.

Figure 10:
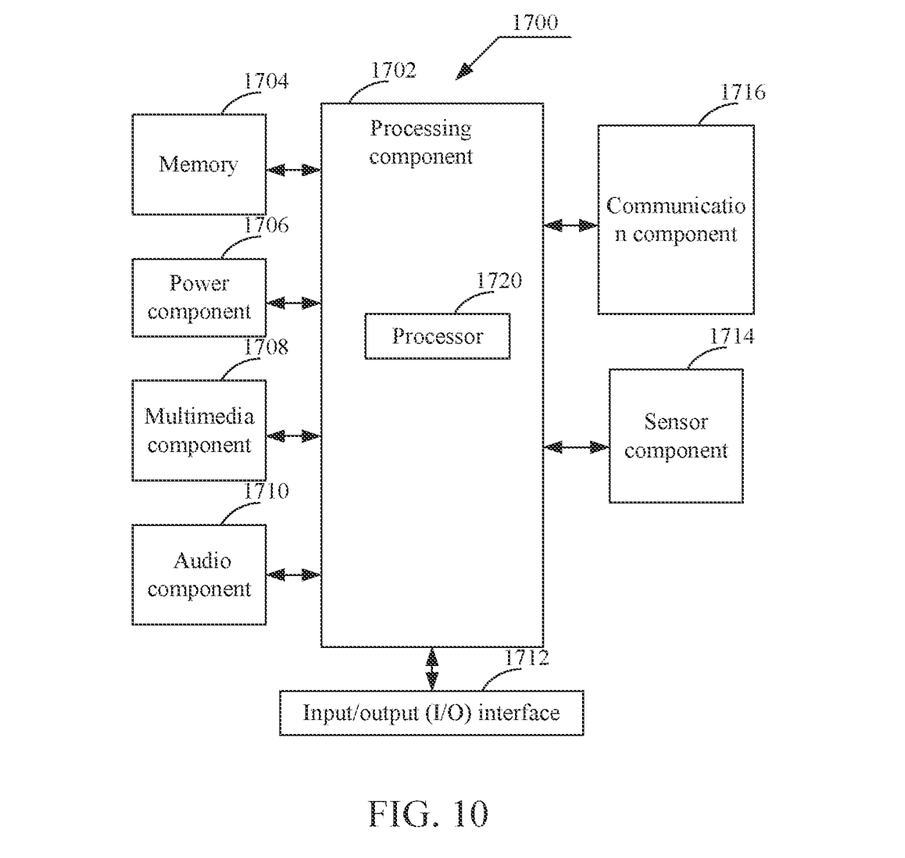
FIG. 10 is a schematic structural diagram of a terminal according to an embodiment of the present disclosure.

FIG. 10 is a schematic structural diagram of a terminal 1700 according to an embodiment of the present disclosure. As shown in FIG. 10, the terminal 1700 may be for example, a mobile phone having a routing function, a computer, a digital broadcast terminal, a messaging apparatus, a gaming console, a tablet, a medical apparatus, exercise equipment, a personal digital assistant, etc.

Referring to FIG. 10, the terminal 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the terminal 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the terminal 1700. Examples of such data include instructions for any applications or methods operated on the terminal 1700, contact data, phonebook data, messages, pictures, video, etc. The memory 1704 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the terminal 1700. The power component 1706 may include a power management system, one or more power sources, and any other components associated with the generation, management, and distribution of power in the terminal 1700.

The multimedia component 1708 includes a screen providing an output interface between the terminal 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1708 includes a front camera and/or a rear camera. The front camera and the rear camera may receive an external multimedia datum while the terminal 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the terminal 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the terminal 1700. For instance, the sensor component 1714 may detect an open/closed status of the terminal 1700, relative positioning of components, e.g., the display and the keypad, of the terminal 1700, a change in position of the terminal 1700 or a component of the terminal 1700, a presence or absence of user contact with the terminal 1700, an orientation or an acceleration/deceleration of the terminal 1700, and a change in temperature of the terminal 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, a microwave sensor or a temperature sensor.

The communication component 1716 is configured to facilitate communication, wired or wirelessly, between the terminal 1700 and other apparatus. The terminal 1700 may access a wireless network based on a communication standard, such as WiFi, 2G, or 3G, or a combination thereof. In one embodiment, the communication component 1716 receives a broadcast signal or broadcast associated information from an external broadcast management system via a broadcast channel. In one embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments of the present disclosure, the terminal 1700 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the method for recommending the video as shown in FIG. 3.

In some embodiments of the present disclosure, there is also provided a non-transitory computer readable storage medium including instructions, such as the memory 1704 including instructions, the above instructions may be executed by the processor 1720 in the terminal 1700 for performing the above-described methods. For example, the non-transitory computer-readable storage medium may be a ROM, a Random Access Memory (RAM), a CD-ROM, a magnetic tape, a floppy disc, an optical data storage device, and the like.

The embodiments of the present disclosure further provide a server, including: a memory, a processor and a computer program stored on the memory and capable of being run on the processor; and the processor is configured to: receive a target video and a video cover set sent by a terminal, and the video cover set includes at least two video covers; for any video cover in the video cover set, acquire a video feature of the target video and a cover feature of the video cover, and the video feature includes a video type, and the cover feature includes a cover style; determine a user group corresponding to the video cover according to the video feature and the cover feature, and the user group includes at least one user; and add the video cover to the target video, and recommend the target video added with the video cover to the user group.

Figure 11:
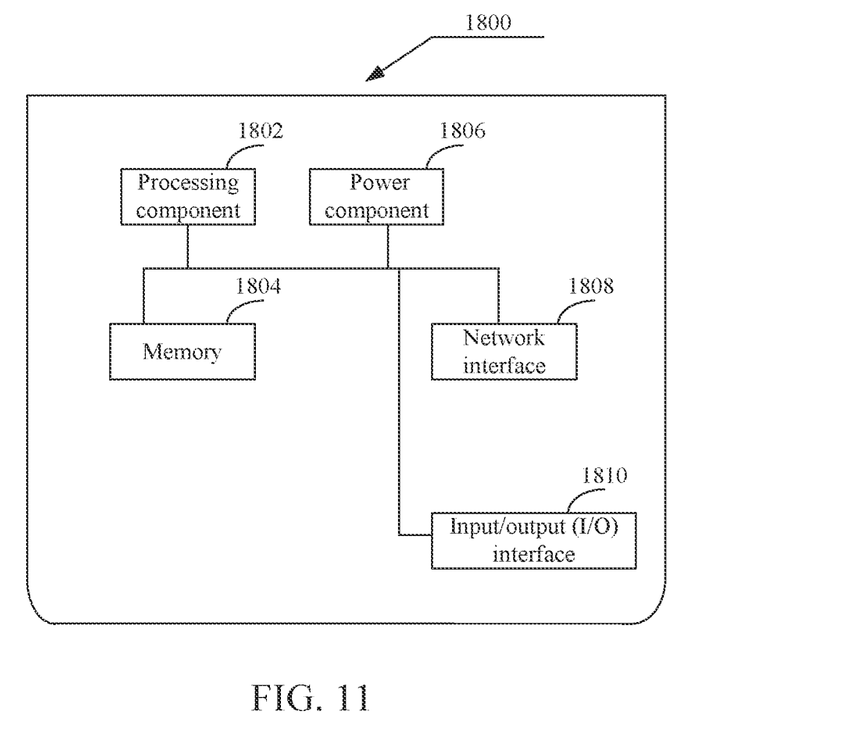
FIG. 11 is a schematic structural diagram of a server according to an embodiment of the present disclosure.

FIG. 11 is a schematic structural diagram of a server 1800 according to an embodiment of the present disclosure. Referring to FIG. 11, the server 1800 includes a processing component 1802, which further includes one or more processors and a memory resource represented by a memory 1804 for storing instructions executable by the processing component 1802, such as an application program. The application program stored in the memory 1804 may include one or more modules, each corresponding to a set of instructions. In addition, the processing component 1802 is configured to execute the instructions to execute the method for recommending the video as shown in FIG. 4.

The server 1800 may also include: a power component 1806 configured to perform power management of the server 1800, a wired or wireless network interface 1808 configured to connect the server 1800 to the network, and an input/output (I/O) interface 1810. The server 1800 may operate an operating system stored in the memory 1804, such as Windows Server™, Mac OS X™, Unix™, Linux™, Free-BSD™, or the like.

All the embodiments of the present disclosure may be executed individually or in combination with other embodiments, which are all regarded as the protection scope of the present disclosure.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for recommending a video, performed by a terminal, and comprising:

acquiring at least two related videos of a target video, wherein the related videos are obtained through a video similarity matching algorithm;

for each related video, searching for a video cover associated with the related video, wherein the video cover is determined according to behavior information of a user performing an operation on the related video, and adding found video cover to a video cover set, wherein the video cover set comprises at least two video covers; and sending the target video and the video cover set to a server, so that different video covers are added to the target video based on the video cover set by the server and the target video with the different video covers is recommended to different user groups by the server, wherein each user group comprises at least one user.

2. The method according to claim 1, wherein the video cover associated with the related video is a video cover with highest popularity;

before the searching for the video cover associated with the related video, the method further comprises:

acquiring the behavior information of the user performing the operation on the related video;

determining popularity of each video cover corresponding to the related video based on the behavior information; and searching for a video cover with the highest popularity from all video covers corresponding to the related video, and associating the related video with the video cover with the highest popularity.

3. The method according to claim 2, wherein the determining the popularity of each video cover corresponding to the related video based on the behavior information comprises:

for each video cover corresponding to the related video, determining the popularity of the video cover according to the behavior information of the user performing the operation on the related video added with video cover.

4. A method for recommending a video, performed by a server and comprising:

receiving a target video and a video cover set sent by a terminal, wherein the video cover set comprises covers of at least two related videos of the target video, and wherein the related videos are obtained through a video similarity matching algorithm;

for any video cover in the video cover set, acquiring a video feature of the target video and a cover feature of the video cover, wherein the video feature comprises a video type, and the cover feature comprises a cover style;

determining a user group corresponding to the video cover according to the video feature and the cover feature, wherein the user group comprises at least one user; and adding the video cover to the target video, and recommending the target video added with the video cover to the user group.

5. The method according to claim 4, wherein the determining the user group corresponding to the video cover according to the video feature and the cover feature comprises:

inputting the video feature and the cover feature into a pre-trained video recommendation model, and obtaining an identification corresponding to a user group output by the video recommendation model; and determining the user group corresponding to the identification as the user group corresponding to the video cover.

6. The method according to claim 4, wherein the determining the user group corresponding to the video cover according to the video feature and the cover feature comprises:
- determining a set of user groups corresponding to the target video according to the video feature, wherein the set of user groups comprises at least two user groups; and
- determining the user group corresponding to the video cover from the set of user groups according to the cover feature.

7. The method according to claim 4, wherein after the receiving the target video and the video cover set sent by the terminal, the method further comprises:
- verifying the target video and the video cover in the video cover set according to a set screening strategy; and
- performing the step of acquiring the video feature of the target video and the cover feature of the video cover for any video cover passing verification in the video cover set, in response to the target video passing verification.

8. A terminal, comprising:
- a processor; and
- a memory, configured to store a computer program capable of being run on the processor, wherein the processor is configured to execute the computer program to implement the following steps:
- acquiring at least two related videos of a target video, wherein the related videos are obtained through a video similarity matching algorithm;
- for each related video, searching for a video cover associated with the related video, wherein the video cover is determined according to behavior information of a user performing an operation on the related video, and adding found video cover to a video cover set, wherein the video cover set comprises at least two video covers; and
- sending the target video and the video cover set to a server, so that different video covers are added to the target video based on the video cover set by the server and the target video with the different video covers is recommended to different user groups by the server, wherein each user group comprises at least one user.

9. The terminal according to claim 8, wherein the video cover associated with the related video is a video cover with highest popularity;
- before the searching for the video cover associated with the related video, the processor is further configured to:
- acquire the behavior information of the user performing the operation on the related video;
- determine popularity of each video cover corresponding to the related video based on the behavior information; and
- search for a video cover with the highest popularity from all video covers corresponding to the related video, and associate the related video with the video cover with the highest popularity.

10. The terminal according to claim 9, wherein the processor is further configured to:
- for each video cover corresponding to the related video, determine the popularity of the video cover according to the behavior information of the user performing the operation on the related video added with video cover.

* * * * *